United States Patent
Bowlby, Jr. et al.

[11] Patent Number: 5,283,426
[45] Date of Patent: Feb. 1, 1994

[54] METHODS AND APPARATUS FOR OBTAINING NONLINEAR RESPONSES FROM PHOTODETECTOR ARRAYS

[75] Inventors: James O. Bowlby, Jr., San Jose; Gregory E. Johnston, Redondo Beach, both of Calif.

[73] Assignee: X-Ray Scanner Corporation, Torrance, Calif.

[21] Appl. No.: 63,452

[22] Filed: May 17, 1993

[51] Int. Cl.⁵ .................. H01J 40/14; H04N 3/14
[52] U.S. Cl. ........................... 250/208.1; 348/294
[58] Field of Search ............ 250/208.1, 214.1, 214 R; 358/213.31, 213.19

[56] References Cited

U.S. PATENT DOCUMENTS

| | | | |
|---|---|---|---|
| 5,055,667 | 10/1991 | Sayag | 250/208.1 |
| 5,214,274 | 5/1993 | Yang | 250/208.1 |
| 5,225,696 | 7/1993 | Bahraman | 250/208.1 |

*Primary Examiner*—Michael Messinger
*Attorney, Agent, or Firm*—Robert E. Malm

[57] ABSTRACT

A charge collection control circuit generates a time-varying voltage that is used to control the charge collection process in an MOS photodetector for the purpose of obtaining greater dynamic range. Control is exercised either by means of an integration control electrode that controls the flow of charge from a charge-collecting region to a sink or by means of a transfer electrode that controls the flow of charge from the charge-collecting region to a charge-transport region through which the collected charge flows to an output circuit.

16 Claims, 4 Drawing Sheets

METHODS AND APPARATUS FOR OBTAINING NONLINEAR RESPONSES FROM PHOTODETECTOR ARRAYS

BACKGROUND OF THE INVENTION

This invention relates generally to solid-state photodetectors wherein photogenerated minority carriers are collected in storage potential wells. More specifically, the invention relates to methods, circuits, and apparatus for obtaining nonlinear responses from arrays of such photodetectors.

A metal-oxide-semiconductor (MOS) sandwich structure wherein the metal electrode is insulated from the semiconductor substrate by a thin oxide layer can function as a light detector under appropriate circumstances. If a voltage of appropriate polarity is applied across the MOS device, the majority carriers are removed from the semiconductor region that is closest to the metal electrode and a potential well is formed that is capable of storing minority carriers. Photons that pass through the thin metal electrode and into the semiconductor are absorbed, thereby freeing minority carriers that are collected in the potential well. The number of minority carriers that are collected in the potential well is a measure of the number of photons that have entered the semiconductor. Equivalently, the number of collected minority carriers is a linear measure of the intensity of the light to which the device has been exposed. The term MOS, as used herein, is intended to include structures wherein another conducting material is substituted for the metal and another insulator is substituted for the oxide.

The MOS photodetector is used to measure the intensity of incident light by (1) dumping any charge that is present in the well, (2) exposing the photodetector to the light for an interval of time, and (3) measuring the charge collected in the well at the completion of the exposure. The minimum light intensity $I_{min}$ that can be measured is limited by thermally-generated minority carriers that collect in the well during the exposure. The maximum light intensity $I_{max}$ that can be measured is usually limited by the quantity of charge that can be stored in the potential well. The resulting dynamic range of an MOS photodetector is equal to $I_{max}/I_{min}$.

For many applications it is desirable that the charge collected in the potential well of an MOS photodetector be a nonlinear monotonically-increasing function of light intensity in order to increase $I_{max}$ and the dynamic range of the device. This approach can also provide improved measurement precision at low light intensities.

A method of achieving nonlinear functional relationships between collected charge and light intensity is described by Sayag in U.S. Pat. No. 5,055,667 issued Oct. 8, 1991 which is incorporated by reference. The essence of the method is to bleed off charge from the potential well as charge collects in the well during exposure to light. The amount of charge bled off during the exposure is made to depend on the light intensity—the amount being increasingly larger as the intensity becomes larger. The practice of Sayag's invention requires that the photodetectors have special sink regions to receive the excess charge from the photodetector sites.

The present invention provides a means for practicing the method described by Savag and also includes a method of charge collection control not disclosed by Sayag.

BRIEF SUMMARY OF INVENTION

The charge collection control circuit is intended for use with photodetectors having metal-oxide-semiconductor (MOS) structures.

The typical MOS photodetector is comprised of two regions: (1) a charge-collecting region where the charge generated in the semiconductor by exposure to incident light is stored; and (2) a charge-transport region to which charge originating in the charge-collecting region can be transferred for readout. The transfer of charge from charge-collecting region to charge-transport region is accomplished by placing an appropriate voltage on a transfer electrode.

Some MOS photodetectors include a sink region to which charge above a certain level in the charge-collecting region can be bled off so as not to exceed the charge capacity of the charge-transport region. The bleeding of charge from the charge collecting region to the sink region is controlled by the voltage placed on the integration control electrode.

It is customary to operate an MOS photodetector during the charge-collecting phase with a voltage level on the transfer electrode that prevents charge in the charge-collecting region from moving to the charge-transport region. During the readout phase the voltage placed on the transfer electrode causes all of the charge in the charge-collecting region to transfer to the charge-transport region. The voltage on the integration control electrode is usually fixed.

A fixed integration control voltage results in the collected charge during an exposure being proportional to light intensity up to a saturation light intensity. The collected charge is independent of light intensity for intensities above the saturation light intensity.

By varying the integration control voltage in an appropriate fashion during the exposure of the photodetector to light, a nonlinear relationship between collected charge and incident light intensity can be obtained and the dynamic range of the photodetector can be significantly increased.

It has been discovered that a similar result can be achieved by varying the transfer voltage during the exposure of the photodetector to light.

The combination of a charge collection control circuit and a photodetector array converts the inherent linear response of the photodetectors to a nonlinear response. The charge collection control circuit controls the charge collection process in the charge-collecting region of a photodetector by supplying a time-varying voltage tailored for either the integration control electrode or the transfer electrode. A compact representation of the appropriate time varying voltage function is either communicated to or stored in the control circuit. The control circuit generates the desired voltage function from the representation for each exposure of the photodetector to light.

DESCRIPTION OF THE PREFERRED EMBODIMENT

A typical charge-coupled photodetector array consists of a linear array of closely spaced MOS photodetectors and an adjacent analog shift register composed of charge-coupled devices (CCDs). The photodetectors are coupled to adjacent CCDs in the shift register so that the charges collected in the photodetector potential wells can be transferred to the adjacent CCDs and read by shifting the charges along the shift register to an output circuit. Some charge-coupled photodetector arrays also include a sink region, accessible to each photodetector, for either preventing charge from collecting in the photodetector potential wells or getting rid of charge that may exceed the capacity of the CCD potential wells to which the photodetector-collected charge is periodically transferred.

Figure 1:
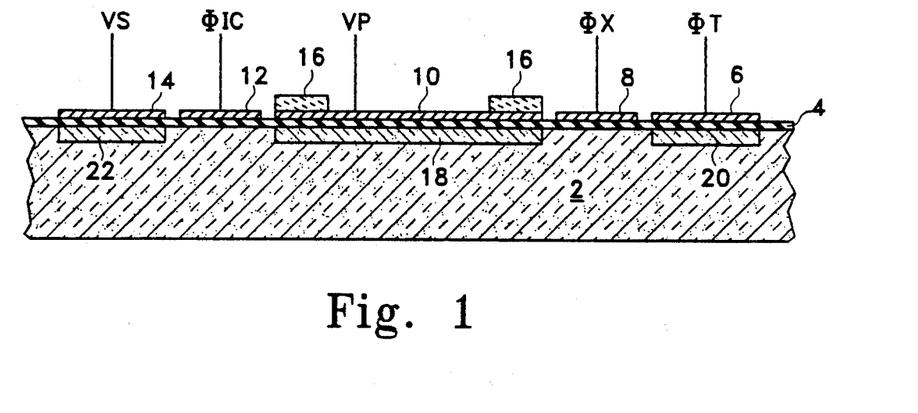
FIG. 1 shows the structure of an MOS photodetector having a charge-collecting region, a charge-transport region, and a sink region.

The structure of a single photodetector, its associated shift register CCD, and the sink is shown in FIG. 1. The structure consists of a semiconductor substrate 2, a thin oxide layer 4, and electrodes 6, 8, 10, 12, and 14. Charge is generated by light passing between light shields 16 through electrode 10 and into semiconductor region 18. A voltage VP is applied to electrode 10 thereby establishing a potential well and enabling minority carriers to accumulate in semiconductor region 18. All voltages are referenced to substrate 2. It is assumed for purposes of discussion that the substrate is at zero potential.

Semiconductor region 20 beneath electrode 6 is part of the shift register that provides the means for shifting the photodetector charges out of the photodetector array. The voltage $\phi T$ applied to electrode 6 is preprogrammed to permit storage of charge during charge transfer from region 18 to region 20 and to facilitate transfer of charge along the shift register during readout. A voltage $\phi X$ applied to transfer electrode 8 provides the means for controlling the flow of charge between regions 18 and 20.

Semiconductor region 22 beneath electrode 14 is a sink region for charge generated in region 118. The voltage VS applied to electrode 14 establishes a potential well for receiving charge from region 18. A voltage $\phi IC$ applied to integration control electrode 12 controls the flow of charge between regions 18 and 22.

If voltage $\phi IC$ is zero, the charge collected in region 18 cannot flow into region 22. If voltage $\phi IC$ is equal to or greater than the voltage VP (and VS is greater than VP), the region 18 charge empties into region 22. If voltage WIC is set to some intermediate value, charge will collect in region 18 until the collected charge modifies the potential just beneath the collected charge in region 18 to equal the potential at the oxide-semiconductor interface beneath electrode 12 at which time any further generated charge will flow into region 22. Thus, the voltage $\phi IC$ determines the maximum charge that can be collected in region 18.

A voltage $\phi IC$ that decreases from a predetermined maximum absolute value to zero during the exposure time establishes a maximum level of collected charge in region 18 as a function of time, the maximum level of collected charge ranging from near zero to an overall maximum value. The maximum voltage value is usually chosen such that the overall maximum level of collected charge in region 18 represents the maximum charge that can be transferred to region 20 without overflowing. If the voltage $\phi IC$ varies in such a way as to cause the slope of the maximum level of collected charge as a function of time to continually increase with time, an increased dynamic range of the device results. Further details of this method can be obtained from Sayag referenced above.

Figure 2:
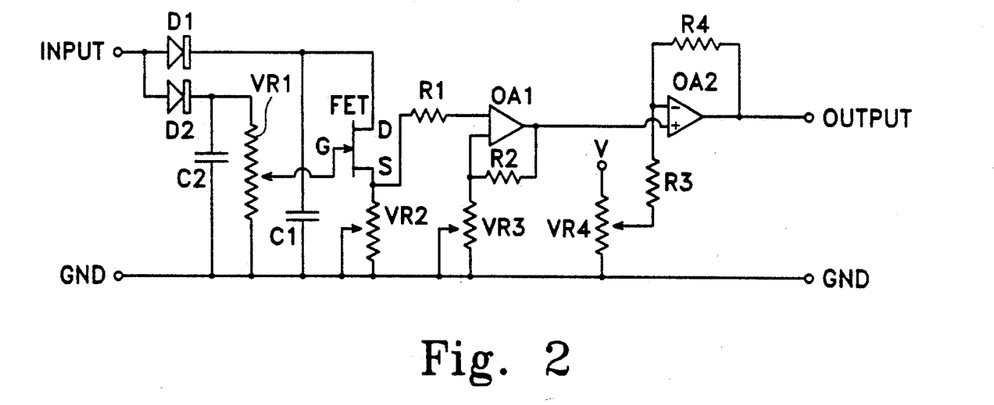
FIG. 2 shows an analog embodiment of the charge collection control circuit.

A charge collection control circuit which transforms a rectangular input pulse into a shaped pulse having a duration equal to the desired integration time (i.e. exposure time) and having the attributes specified in the preceding paragraph is shown in FIG. 2.

The input pulse is of sufficient duration to completely charge capacitors C1 and C2 through diodes D1 and D2 respectively. The charge stored in C2 leaks off through variable resistor VR1 which provides a voltage proportional to the discharge current to the gate G of the field effect transistor FET.

If the voltage at gate G is zero, capacitor C1 will discharge through the field effect transistor FET and the voltage at source S will remain constant until the voltage or drain D drops below the voltage on gate G, at which time the voltage at source S will quickly ramp to zero. By moving the tap on variable resistor VR1 above ground, a small decaying signal is applied to gate G of field effect transistor FET with the result that the voltage at source S ramps downward slowly at first and then rapidly toward the end of the integration period.

The transition point between the slow and fast ramps is controlled by the position of the VR1 tap. The overall integration time is controlled by the tap position of variable resistor VR2.

The operational amplifier OA1 provides gain at a level controlled by the tap position of variable resistor VR3. The operational amplifier OA2 provides the means for offsetting the OA1 output by adjusting the position of the tap of variable resistor VR4.

The charge collection control circuit of FIG. 2 was tested with the Loral-Fairchild CCD181 a 2592-element photodetector array designed for industrial measurement, telecine, and document scanning applications which require high resolution, high sensitivity and high data rate. The individual cells of the device are structured as shown in FIG. 1. The Loral-Fairchild CCD181DB Design Development Board was used in testing the circuit with the CCD181 device. The evaluation board was modified to provide a longer transfer pulse to allow enough time for C1 and C2 to completely charge.

The active devices used in the circuit were as follows: D1 and D2, 1N4152; FET, J108; OA1 and OA2, LM324. The values of the passive devices were as follows: C1=0.022 μF, C2=0.022 μF, VR1=10 kΩ, VR2=10 kΩ, VR3=1 kΩ, R2=2 kΩ, R3=50 kΩ, R4=50 kΩ. The taps of the variable resistors were set to the following resistance values: VR1 tap=400 Ω, VR2 tap=6 kΩ, VR3 tap=0.7 kΩ, VR4 tap=0 kΩ.

The output of the circuit decreased from 8 volts to ground over a period equal to the entire integration period.

Ambient light of approximately 50 footcandles resulted in 0.26 volts at the output of the CCD181 when the output of the charge collection control circuit was connected to the integration control electrode of the CCD181. A fluorescent lamp producing approximately 2000 footcandles placed directly over the CCD181 resulted in 0.68 volts at the output. The maximum available output from the CCD181 was 0.95 volts.

With a constant 8 volts applied to the integration control electrode 12 (FIG. 1) rather than the charge col section control voltage from the circuit of FIG. 2, exposure of the CCD181 to 130 foot-candles resulted in an output of 0.68 volts.

Thus, the use of the circuit of FIG. 2 increased the dynamic range of the CCD181 by a factor of 15.4 (i.e. 2000 foot-candles divided by 130 foot candles).

Figure 3:
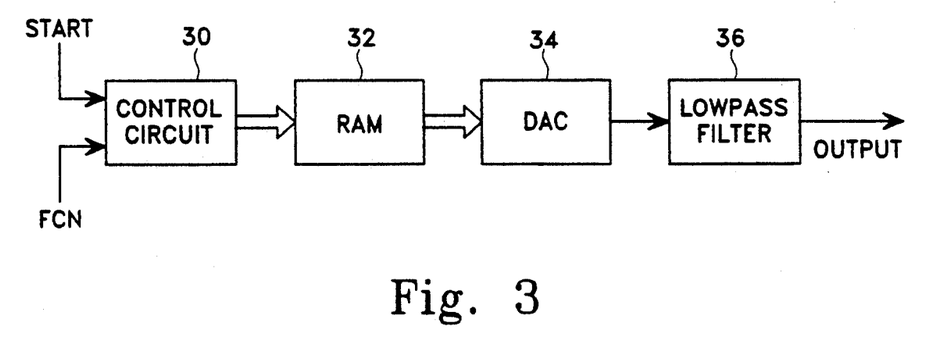
FIG. 3 shows a digital embodiment of the charge collection control circuit that utilizes a RAM for the storage of the representation of the charge collection control function.

An alternative embodiment of the charge collection control circuit is shown in FIG. 3. The control circuit 30 provides the means for storing in the RAM 32 12 bit amplitude samples of the charge collection control function supplied at initial startup by the imaging system in which the charge-coupled photodetector array is used. The imaging system supplies 8192 amplitude samples equispaced over the exposure period though the number is not critical. RAM 32 is either a single RAM or a combination of RAMs having 13 address lines and 12 data lines.

The clock input in conjunction with the start input causes the control circuit 30 to generate a sequence of addresses which are supplied to RAM 32 and cause the RAM to produce digital representations of the amplitude samples of the charge collection control function in proper order. The clock frequency equals the number of samples times the reciprocal of the exposure time so that the complete sequence of amplitude samples is read out during the exposure time. The range of exposure times is governed by the specifications of the charge-coupled photodetector array with which the charge collection control circuit is to be used.

At the conclusion of a readout of the amplitude samples, the address of the first sample is maintained on the RAM address lines until the start signal once again occurs at which time the sequence of amplitude samples is once again read out. This procedure avoids the occurrence of a transient at the output of the charge collection control circuit when the generation of the charge collection control function begins. RAM 32 must, of course, have a response time that is short compared to the clock period.

The control circuit 30 may alternatively include a RAM for storing the times $t_1, t_2, \ldots t_N$ when the N amplitude samples should appear at the output port of RAM 32 where the times are such that the change in amplitude from one amplitude sample to the next exceeds some minimum value. In this way the storage of essentially redundant amplitude samples is avoided and the size of RAM 32 is minimized. In general, the amplitude samples will be non-uniformly spaced over the exposure period with this configuration.

The start input causes the control circuit DO to keep track of time by accumulating clock pulses in a time register. After recording each clock pulse the control circuit 30 compares the time stored in the time register with the first amplitude sample time $t_1$. When the register time equals $t_1$, the control circuit 30 causes the address of the first amplitude sample to be supplied to RAM 32 which results in RAM 32 producing a digital representation of the first amplitude sample of the charge collection control function. The process is repeated for sample times $t_2$ through $t_N$ thereby causing the amplitude samples to appear at appropriate times in the proper sequence.

The sequence of digital amplitude samples from RAM 32 are converted to a stepped analog function by means of the 12-bit digital-to-analog converter (DAC) 34. The DAC 34 must also have a response time that is short compared to the clock period and must produce an output voltage large enough to meet the integration control voltage range specification for the charge-coupled photodetector array with which the charge collection control circuit is to be used.

A particular embodiment of the charge collection control circuit of FIG. 3 for use with the Loral-Fairchild CCD181 charge-coupled photodetector array utilized two 8-bit RAMs (Cypress Semiconductor Corp., 7C185) for RAM 32 and for DAC 34 and lowpass filter 36, a 12-bit DAC (Analog Devices Inc., 9713B), which sinks current from a 2-volt reference thereby producing a 0 to 2 volt output, in combination with an operational amplifier with a gain of 4.9 (Elantek, Inc., EL2041) that expands the DAC voltage range to 0 to 9.8 volts (consonant with the voltage range of 0 to 8 volts specified for the CCD181 integration control electrode).

Figure 4:
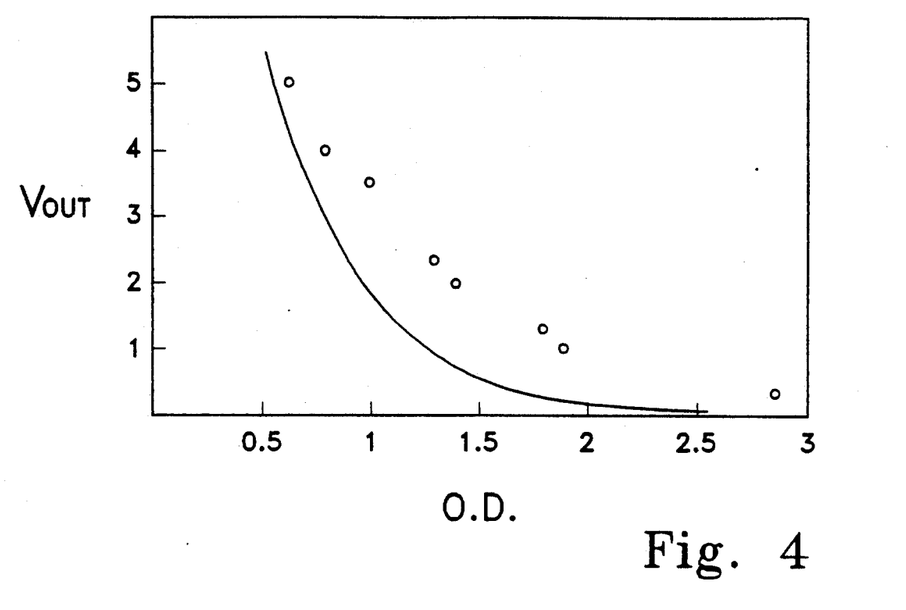
FIG. 4 shows experimental results obtained with a algital embodiment of the charge collection control circuit controlling the integration control electrode of the Loral-Fairchild CCD181 line image sensor using the control function defined by equation (1).

The results of testing this configuration with the charge collection control function $$VC = VS \frac{e^{Kt} - 1}{e^K - 1} \quad (1)$$

are shown in FIG. 4. The exposure time extends from $t=0$ to $t=1$, $k=5$, and $VS=1$. The abscissa is optical density—the logarithm to the base 10 of the reciprocal of light intensity to which the CCD181 was exposed. The ordinate is the output voltage of the CCD181. The solid curve is the theoretical output voltage with no bleeding of charge from region 18 to region 22 (FIG. 1). The solid dots are the results obtained when using the charge collection control circuit to limit the charge collected in region 18. The expansion of dynamic range through the use of the charge collection control circuit should be noted.

The charge collection control circuit was also tested using the charge collection control function $$VS = \begin{cases} -VO \ln(1 - t); & t < 1 - VO/VMAX \\ VSAT - VMAX(1 - t); & t \geq 1 - VO/VMAX \end{cases} \quad (2)$$

where $$VMAX = VO \, e^{(VSAT/VO - 1)}$$

Figure 5:
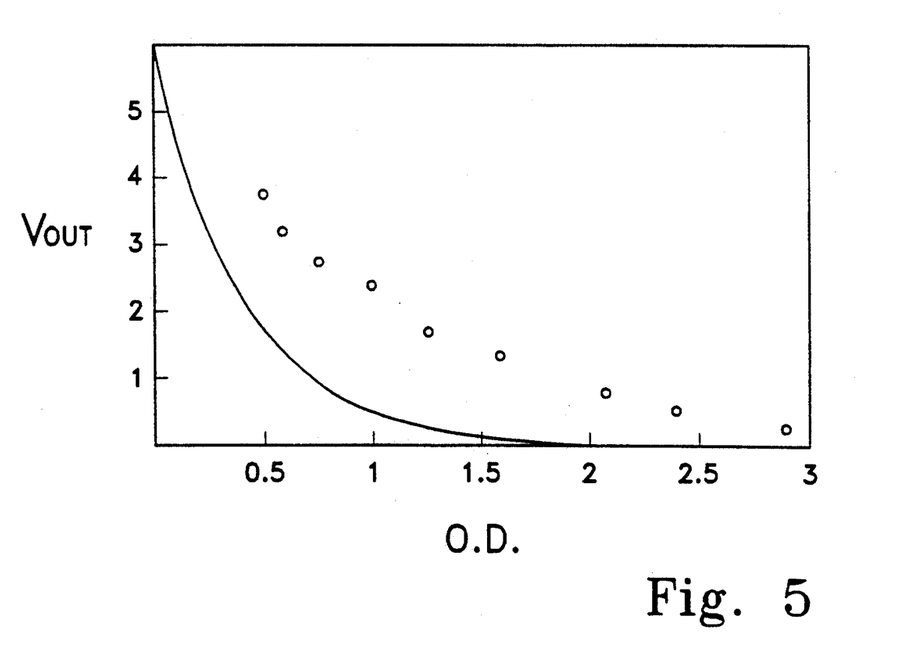
FIG. 5 shows experimental results obtained with a digital embodiment of the charge collection control circuit controlling the integration control electrode of the Loral-Fairchild CCD181 line image sensor using the control function defined by equation (2).

The results shown in FIG. 5 were obtained for $VO=0.15$ and $VSAT=1$. The solid curve again is the theoretical output voltage with no bleeding of charge from region 18 to region 22 (FIG. 1). The solid dots are the results obtained when using the charge collection control circuit to limit the charge collected in region 18. The expansion of dynamic range through the use of the charge collection control circuit again should be noted.

Figure 6:
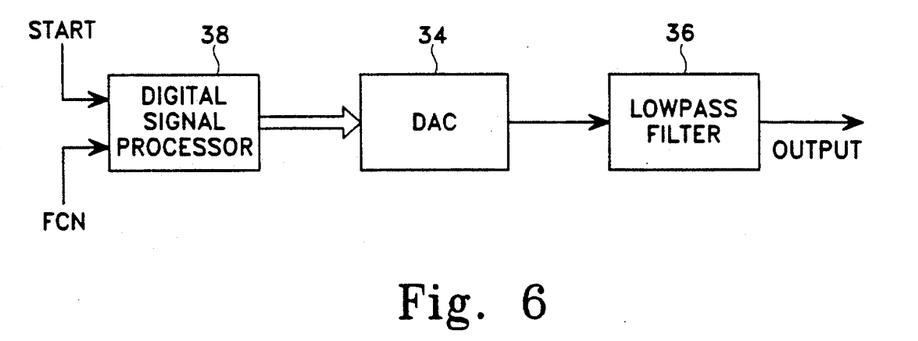
FIG. 6 shows a digital embodiment of the charge collection control circuit that utilizes a digital signal processor for generating the charge collection control function.

An alternative to the embodiment shown in FIG. 3 is used when the charge collection control function can be expressed in terms of standard functions such as logarithms, cosines, sines, exponentials, etc. The alternative embodiment is shown in FIG. 6.

The DAC 34 and the lowpass filter 36 are the same devices discussed in connection with FIG. 3. The digital signal processor 38 accepts a functional description of the charge collection control function and generates amplitude values of the function at time intervals equal to exposure time divided by 8192 in the preferred embodiment. The clock frequency is chosen large enough to perform an amplitude calculation in the time allotted.

After generating the complete charge collection control function, the DSP 38 continually presents the first amplitude sample at its output until another start signal is received at which time it recalculates and outputs each of the amplitude samples once again.

Many charge-coupled photodetector arrays do not have region 22 (FIG. 1) which acts a sink for excess charge generated in region 18. However, an equally satisfactory avenue for disposing of charge is region 20 which forms part of the shift register that is used for transporting the charge generated in region 18 to an output circuit. The method consists of: (1) applying the voltage generated by the charge collection control circuit to electrode 8 during an exposure; (2) isolating the shift register CCDs from the photodetectors at the end of the exposure by holding electrode 8 at 0 volts while the charge belied off from region 18 to region 20 during step 1 is shifted to one end of the shift register and disposed of by the output circuit; (3) applying a fixed voltage to electrode 8 to cause the charge collected in region 18 to transfer to region 20; (4) isolating the shift register CCDs from the photodetectors by holding electrode 8 at 0 volts while the charge transferred from region 18 to region 20 in step (3) is shifted to one end of the shift register and read out by means of the output circuit; and (5) repeating steps (1) through (5).

The particular embodiment of the charge collection control circuit shown in FIG. 3 and using the charge collection control function defined by equation (1) was tested with the Toshiba CCD143D charge-coupled photodetector array. Results similar to those shown in FIGS. 4 and 5 were obtained.

Figure 7:
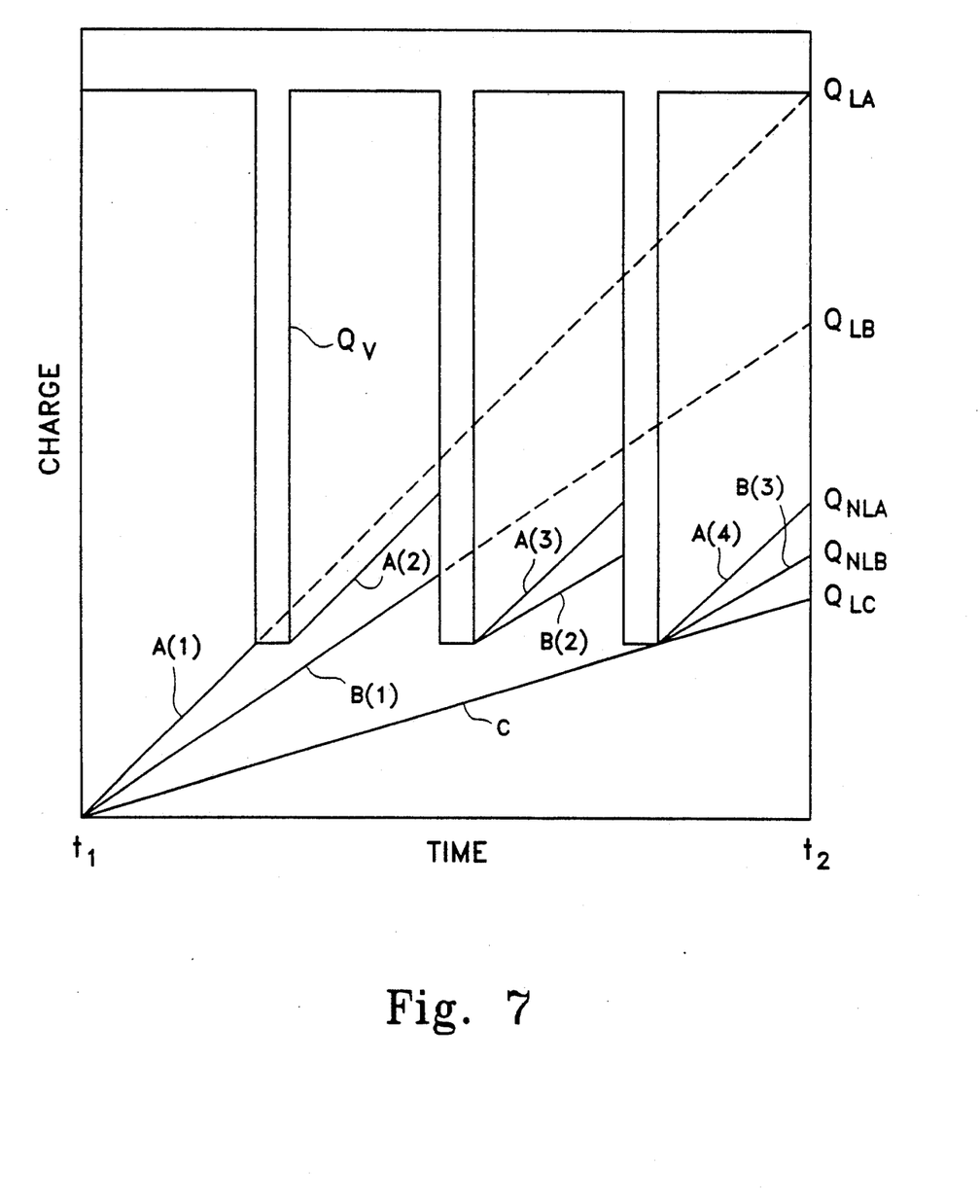
FIG. 7 illustrates a process for obtaining a nonlinear response from photodetectors by using a plurality of voltage pulses to control the charge collection process in a photodetector.

The disposal of excess charge that is generated in region 18 via charge transport region 20 and the associated shift register may be more conveniently accomplished by using a charge collection control circuit that produces a sequence of voltage pulses during an exposure with the consequent results shown in FIG. 7. FIG. 7 shows plots of charge contained in the charge-collecting region 10 as a function of time during an exposure of the photodetector to light for three light intensities. The time $t_1$ corresponds to the beginning of an exposure, immediately after the complete emptying of charge from region 18. The time $t_2$ corresponds to the end of the exposure.

If electrode 8 is held at zero voltage throughout the exposure, a high light intensity results in the linear accumulator of charge in region 18 as shown by line segment A(1) and its dashed extension. It results in a charge accumulation of $Q_{LA}$ during an exposure. An intermediate intensity results in a charge accumulation of $Q_{LB}$ as indicated by line segment B(1) and its dashed extension and a low intensity results in a charge accumulation of $Q_{LC}$ as indicated by line segment C.

If instead, a three-pulse voltage waveform is applied to electrode 8 during the exposure so that the charge accumulation in region 18 is limited to $Q_V$ at any particular time during he exposure, then a nonlinear response from the photodetector is obtained. The charge accumulation resulting from the high intensity exposure follows the A(1)/A(2)/A(3)/A(4) path ending with a value of $Q_{NLA}$. The charge accumulation resulting from the intermediate intensity exposure follows the B(1)/B(2)//B(3) path ending with a value of $Q_{NLB}$. The charge accumulation resulting from the low intensity exposure is the same as before. Thus, the responses to intensities between low and high are represented by charge accumulations between $Q_{LC}$ and $Q_{NLA}$ while intensities from zero to low are represented by charge accumulations between zero and $Q_{LC}$.

It should be noted that with three equispaced voltage pulses of the same amplitude (as shown in FIG. 7), the photodetector response is linear in the zero to low intensity region and is also linear in the low to high intensity region but with a lower constant of proportionality.

The pulses do not have to be equispaced nor do they have to be of the same magnitude. A variety of nonlinear responses can be obtained by varying the number of pulses occurring during an exposure, by varying the times of occurrence of the pulses, and by varying the amplitudes of the pulses.

Still another pulse parameter that can be used in obtaining particular nonlinear responses are the durations of the pulses. The amount of charge that is transferred from region 18 to region 20 depends both on the amplitude and the duration of the voltage pulse applied to electrode 8. The relationship between pulse duration and charge transferred is shown in FIG. 3-14 of the Toshiba CCD Linear Image Sensor databook published in 1991. For a particular Toshiba device, a pulse duration of 45 ns leaves 18% of the charge at the photosite whereas a pulse duration of 100 ns leaves only 4%. A pulse duration of 200 ns is required to remove essentially all of the charge.

A reason for using a charge collection control voltage having a pulse structure is to ease the problem of getting rid of the excess charge that collects in region 20 during an exposure. With a pulse structure, the excess charge that is collected when a pulse occurs can be shifted down the shift register to the output circuit and disposed of before the next pulse occurs. In this way, small amounts of excess charge are disposed of many times during an exposure rather than one large amount at the end of the exposure. The advantage is that it is less likely that the charge transport capability of the shift register will be exceeded in the former case.

The generation of a plurality of pulses for the purpose of obtaining a nonlinear photodetector response can be accomplished with the apparatus shown in FIGS. 3 and 6.

What is claimed is:

1. A nonlinear photodetector array for use with an imaging system comprising:
   a plurality of photodetector cells, each photodetector cell comprising a charge-collecting region, a charge-transport region, a sink region, an integration control electrode, and a transfer electrode, said charge-collecting region being used to store charge generated by light incident on said cell during each of a plurality of exposures, said imaging system generating a start signal at the beginning of each exposure, said sink region being used as a means for disposing of excess charge in said charge-collecting region, said charge-transport region being used to receive and temporarily store charge collected in said charge-collecting region, the transfer of charge from said charge-collecting region to said sink region being controlled during an exposure by a charge collection control voltage applied to said integration control electrode, the magnitude of said charge collection control voltage at a particular time establishing the amount of charge that can be stored in said charge-collecting region at said particular time, the transfer of charge from said charge-collecting region to said charge-transport region being controlled by a transfer voltage applied to said transfer electrode, the transfer of charge being accomplished by a change in said transfer voltage from a first value to a second value; and a charge collection control circuit comprising a means for storing a representation of a charge collection control function, said function being a function of time defined for a time period extending from zero to a time equal to the duration of an exposure, said representation of said function being a set of values of said function corresponding to a set of sampling times between zero and the exposure duration, said charge collection control circuit also comprising a means for retrieving said representation from said storing means and generating said charge collection control voltage from said stored representation each time a strict signal is inputted, the zero sampling time of said representation corresponding to the time at which said start signal is inputted.

2. The nonlinear photodetector array of claim 1 wherein said retrieving generating means comprises:
   an address generator which causes the function values to appear on the data lines of said storing means at said sampling times when said start signal is inputted;
   a digital-to-analog converter which converts said function values appearing on the data lines of said storing means to analog voltages; and
   a lowpass filter that smooths the analog voltages supplied by said digital-to-analog converter, the output of said lowpass filter being said charge collection control voltage.

3. The nonlinear photodetector array of claim 1 wherein said storing means has an input port for receiving said representation of a charge collection control function from said imaging system, said representation being supplied by said imaging system at startup.

4. The nonlinear photodetector array of claim 1 wherein said charge collection control function defines a plurality of pulses.

5. A method for obtaining a nonlinear response from a photodetector cell comprising a charge-collecting region, a charge-transport region, a sink region, an integration control electrode, and a transfer electrode, said charge-collecting region being used to store charge generated by light incident on said cell during each of a plurality of exposures, said imaging system generating a start signal at the beginning of each exposure, said sink region being used as a means for disposing of excess charge in said charge-collecting region, said charge-transport region being used to receive and temporarily store charge collected in said charge-collecting region, the transfer of charge from said charge-collecting region to said sink region being controlled during an exposure by a charge collection control voltage applied to said integration control electrode, the magnitude of said charge collection control voltage at a particular time establishing the amount of charge that can be stored in said charge-collecting region at said particular time, the transfer of charge from said charge-collecting region to said charge-transport region being controlled by a transfer voltage applied to said transfer electrode, the transfer of charge being accomplished by a change in said transfer voltage from a first value to a second value, said method comprising the step:
   providing a charge collection control voltage in thee form of a plurality of voltage pulses during each exposure.

6. A nonlinear photodetector array for use with an imaging system comprising:
   a plurality of photodetector cells, each photodetector cell comprising a charge-collecting region, a charge-transport region, and a transfer electrode, said charge-collecting region being used to store charge generated by light incident on said cell during each of a plurality of exposures, said imaging system generating a start signal at the beginning of each exposure, said charge-transport region being used to receive and temporarily store charge collected in said charge-collecting region, the transfer of charge from said charge-collecting region to said charge-transport region being controlled during an exposure by a charge collection control voltage applied to said transfer electrode, the magnitude of said charge collection control voltage at a particular time establishing the amount of charge that can be stored in said charge-collecting region at said particular time, said charge-transport regions being charge-coupled in a shift register configuration thereby permitting charge transferred from said charge-collecting regions to said charge-transport regions to be transported to an output circuit at the end of said shift register; and
   a means for providing a charge collection control voltage during each exposure such that a portion of the charge collected in said charge-collecting region during each exposure transfers to said charge-transport region, the amount of charge transferring depending on the amount of charge contained in said charge-collecting region until the terminus of said charge collection control voltage occurs, the terminus being a voltage of sufficient magnitude and duration as to empty said charge-collecting region of charge.

7. The nonlinear photodetector array of claim 6 wherein said charge collection control voltage providing means comprises:
   a means for storing a representation of a charge collection control function, said function being a function of time defined for a time period extending from zero to a time equal to the duration of an exposure, said representation of said function being a set of values of said function corresponding to a set of sampling times between zero and the exposure duration;
   a means for retrieving said representation from said storing means and generating said charge collection control voltage from said stored representation each time a start signal is inputted, the zero sampling time of said representation corresponding to the time at which said start signal is inputted.

8. The nonlinear photodetector array of claim 7 wherein said retrieving-generating means comprises:
an address generator that causes the function values to appear on the data lines of said storing means at said sampling times when said start signal is inputted;
a digital-to-analog converter that converts said function values appearing on the data lines of said storing means to analog voltages;
a lowpass filter that smooths the analog voltages supplied by said digital-to-analog converter, the output of said lowpass filter being the charge collection control voltage.

9. The nonlinear photodetector array of claim 7 wherein said storing means has an input port for receiving a representation of a charge collection control function from said imaging system, said representation being supplied by said imaging system at startup.

10. The nonlinear photodetector array of claim 6 wherein said charge collection control voltage providing means supplies a plurality of voltage pulses, the last pulse occurring during an exposure being the terminus of said charge collection control voltage.

11. A method of using the nonlinear photodetector array of claim 3 comprising the steps:
incorporating in said imaging system a means for obtaining a representation of said charge collection control function;
incorporating in said imaging system a means for communicating said representation and said exposure start signal to said charge collection control circuit;
connecting the output of said charge collection control circuit to the integration control electrodes of said imaging system.

12. A method for using the nonlinear photodetector array of claim 9 comprising the steps:
incorporating in said imaging system a means for obtaining a representation of said charge collection control function;
incorporating in said imaging system a means for communicating said representation and said exposure start signal to said charge collection control circuit;
connecting the output of said charge collection control circuit to the transfer electrodes of said imaging system;
incorporating in said imaging system a means for emptying said charge-transport regions prior to the terminus of said charge-collecting control voltage by shifting the charges contained in said charge-transport regions along said shift register and through said output circuit;
incorporating in said imaging system a means for measuring the charges in said charge-transport regions after the terminus of said charge-collecting control voltage by shrifting the charges contained in said charge-transport regions along said shift register and through said output circuit.

13. A method for obtaining a nonlinear response from a photodetector array comprising a plurality of photodetector cells, each photodetector cell comprising a charge-collecting region, a charge-transport region, and a transfer electrode, said charge-collecting region being used to store charge generated by light incident on said cell during each of a plurality of exposures, said charge-transport region being used to receive and temporarily store charge collected in said charge-collecting region, the transfer of charge from said charge-collecting region to said charge-transport region being controlled during an exposure by a charge collection control voltage applied to said transfer electrode, said charge-transport regions being charge-coupled in a shift register configuration thereby permitting charge transferred from said charge-collecting regions to said charge-transport regions to be transported to an output circuit at the end of said shift register, said method comprising the step:
providing a charge collection control voltage during each exposure such that a portion of the charge collected in said charge-collecting region during each exposure transfers to said charge-transport region, the amount of charge transferring depending on the amount of charge contained in said charge-collecting region, the terminus of said charge collection control voltage being a voltage of sufficient magnitude and duration to empty aid charge-collecting region of charge.

14. The method of claim 13 wherein the charge collection control voltage constitutes a plurality of voltage pulses, the last pulse occurring during an exposure being the terminus of said charge collection control voltage.

15. The method of claim 13 further comprising the step:
disposing of the charge transferred from said charge-collecting region to said transport region during an exposure but prior to the occurrence of said terminus by means of said shift register configuration.

16. The method of claim 15 further comprising the step:
measuring the charge transferred from said charge-collecting region to said transport region by the terminus of said charge collection control voltage by means of said shift register configuration and said output circuit.

* * * * *